June 20, 1950 C. W. BERTHIEZ 2,512,296
DEVICE FOR INDICATING FEEDING MOVEMENT OF
A TOOL IN A MACHINE TOOL OR THE LIKE
Filed Oct. 12, 1945 4 Sheets-Sheet 1

INVENTOR
CHARLES WILLIAM BERTHIEZ
BY
George H. Corey
ATTORNEY

June 20, 1950

C. W. BERTHIEZ 2,512,296

DEVICE FOR INDICATING FEEDING MOVEMENT OF
A TOOL IN A MACHINE TOOL OR THE LIKE

Filed Oct. 12, 1945

INVENTOR
CHARLES WILLIAM BERTHIEZ
BY
George H Corey
ATTORNEY

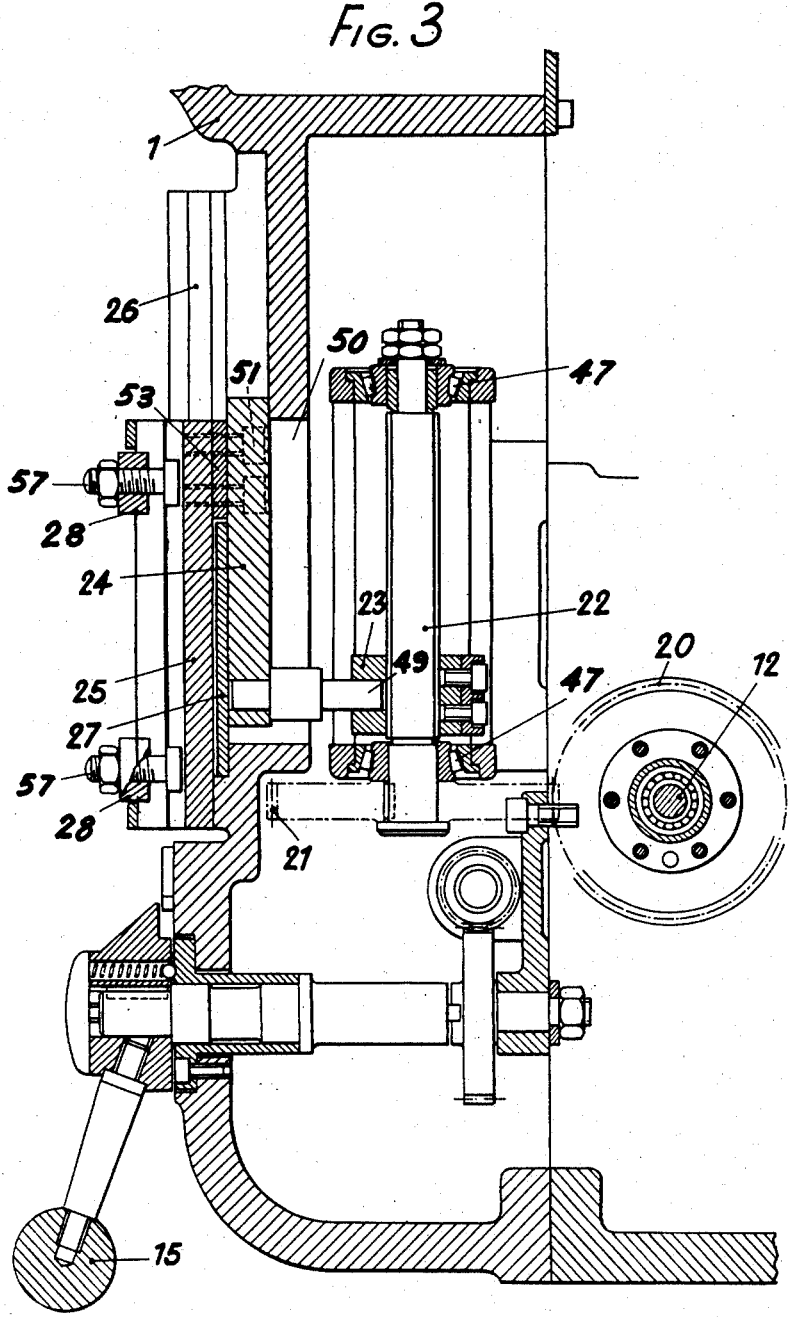

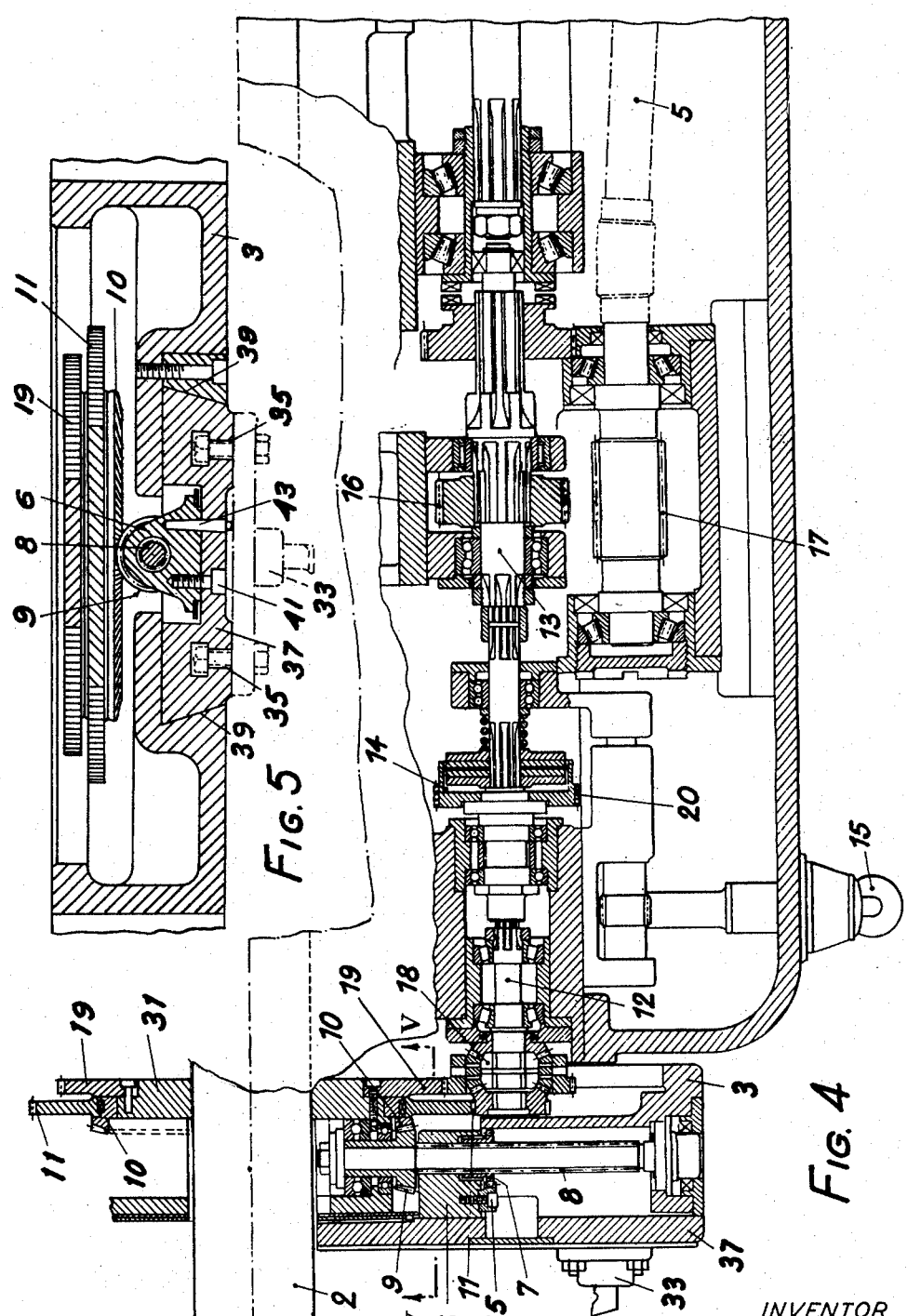

Patented June 20, 1950

2,512,296

UNITED STATES PATENT OFFICE 2,512,296

DEVICE FOR INDICATING FEEDING MOVEMENT OF A TOOL IN A MACHINE TOOL OR THE LIKE

Charles William Berthiez, Paris, France

Application October 12, 1945, Serial No. 622,037
In France March 10, 1945

12 Claims. (Cl. 77—3)

When it is desired to machine a part by means of a tool driven by a rotary head provided with a radial advance or feeding movement, and more particularly in the case of the surfacing plates of boring machines, it is of great advantage for the operator to follow uninterruptedly from his control station the radial displacements of the tool mounted on the rotary head or plate so as to be capable of disengaging by hand the feed controlling means of said tool at the desired moment, thus allowing the operator to execute an accurate operation, or to check the correctness of the disconnection where automatic disconnection is used, the latter allowing moreover greater accuracy in operation.

In my copending United States application Serial No. 620,605, filed October 5, 1945, now abandoned, I have disclosed a device providing independence between the rotary movement of the rotary plate and the radial advance or feeding movement of the tool which allows, as suggested in said copending specification, the movement to be transmitted from a chosen point of the feed shaft to a telltale located at the control station of the machine where it is seen by the operator, the movement of this telltale indicating very accurately the displacement of the tool relative to the rotary plate. I have stated in said prior specification that this telltale may be of any desired type.

The present invention has for its object a particular arrangement adapted to be used for indicating at the control station of the machine the feed of the tool upon its movable supporting member or the rotary head so as to allow the tool to be stopped, either by hand or automatically, at any desired moment.

According to a first characteristic feature of the invention, the machine comprises a carriage which moves in exact synchronism with the tool to be controlled, said carriage carrying members which indicate the displacement of the tool and being located at the control station of the machine while its movement is transmitted to it from the shaft controlling the feed of the tool.

According to a further characteristic feature of the invention, said carriage is provided with stops defining the ends of its stroke together with an adjusting scale for the stops, which latter cooperate with a contacting block adapted automatically to stop the motor providing the drive for the feed of the tool.

These stops which serve also as indicating elements carry moreover preferably verniers cooperating with the above mentioned scale with a view to obtaining a very high accuracy for defining the ends of the stroke of the tool.

According to a still further feature of my invention, the scale is a double one and the two parts thereof may be slightly shifted one with reference to the other so as to compensate for the play between the pinions, screws and nuts, according to whether the tool moves over the head or plate in one direction or the other.

Further features and advantages of the present invention will appear in the reading of following description referring to accompanying drawings illustrating diagramatically and by way of example only an embodiment of my invention as applied to a boring machine.

In said drawings,

Fig. 3 is a vertical section on line III—III of Fig. 2.

Fig. 4 is a longitudinal section on line IV—IV of Fig. 2 of the device for controlling the feed of the tool over the surfacing plate.

Fig. 5 is a section on line V—V of Fig. 4.

Figure 1:
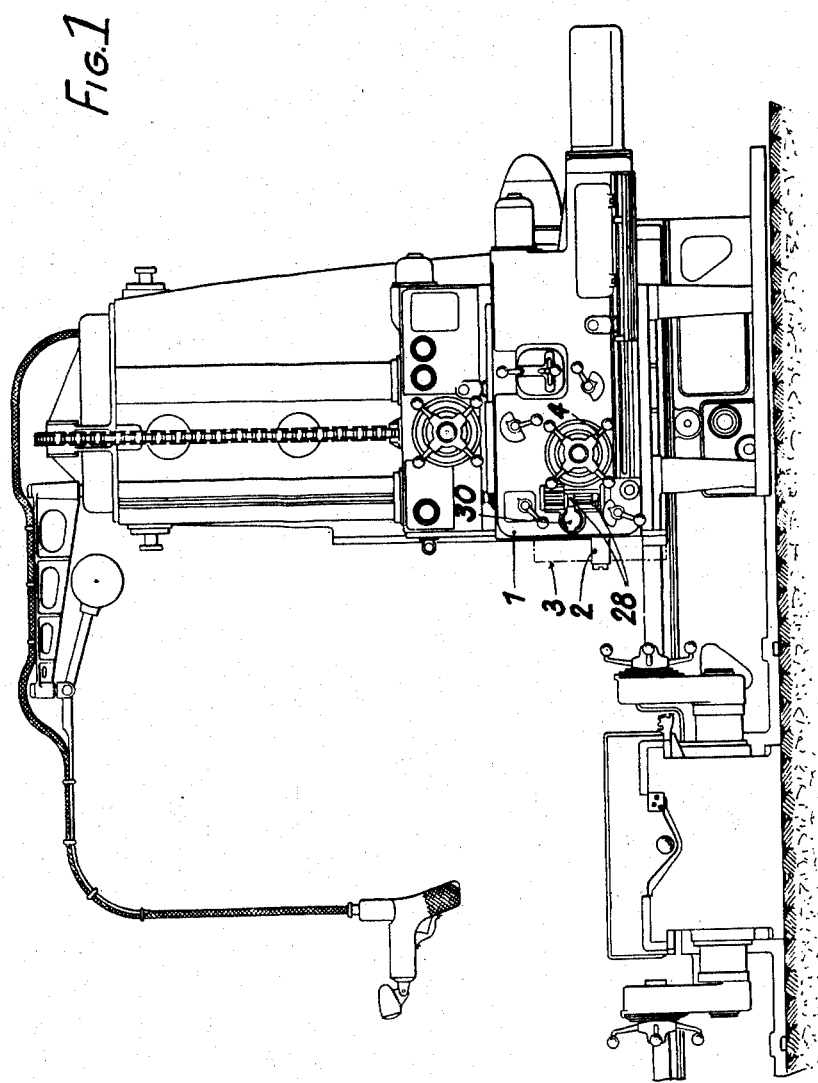
Fig. 1 shows in elevation a part of a boring machine to which the invention is applied.

The invention will be described in connection with a boring machine of conventional type, as shown in Fig. 1, in which the stock 1 is supported in a carriage which is movable vertically on the column of the machine, the stock being movable horizontally in the carriage. The stock 1 supports for rotation on a horizontal axis a boring spindle 2 upon which may be fastened a tool carrying head or surfacing plate 3 shown in section in Figs. 4 and 5. This rotary head may be moved to a selected operating position in relation to the work piece by vertical movement of the carriage and horizontal movement of the stock.

The tool may be fastened in the tool holder 33 which may be held by conventional means, such as bolts, in T slots 35, Fig. 5, provided in a slide member 37 slideable in slideways 39 formed in the rotary head 3 at the forward face thereof. The slide member of plate 37 is adapted to be moved in the slideways 39 radially inwardly and outwardly with respect to the axis of rotation of the spindle 2. By means hereafter described the tool thus may be moved inwardly and outwardly upon the rotary head 3 upon operation of the advance shaft 12 driven from shaft 5 and a motor (not shown), Figs. 3 and 4, or by operation of handwheel 4, Fig. 1.

It should, however, be well understood that my invention is applicable not only to this type of machine but also to any other machine tool wherein it is desired to control in an extremely accurate manner the position and the movement of a tool carried by a moving support and the feeding movement which should be independent of the movement of said support.

In the embodiment illustrated in the drawings the slide member 37 carries a travelling member 6, Figs. 4 and 5, fastened to the slide member by means of screw 41 and pin 43. The travelling member 6 carries a tapped sleeve 7 held in position in the member 6 by positioning screw 45. A lead screw 8 is supported in suitable bearings carried by the rotary head 3 for rotation on its axis extending radially with respect to the axis of the spindle 2. The thread formed in the sleeve 7 is adapted to engage the thread of the lead screw 8 to effect travelling movement of the sleeve and the member 6 along the lead screw inwardly and outwardly with respect to the axis of spindle 2 upon rotation of this lead screw in one direction and the other. Fastened on the lead screw 8 adjacent the inner end thereof is a bevel gear 9 meshing with a bevel gear 10 rotatable on the axis of the spindle 2 and fastened upon and concentric with toothed wheel or gear 11, as shown in Figs. 4-5. The gear 11 is supported on and for rotation relative to the back member 31 of the rotary head 3.

When the rotary head is stopped rotation of the gear 11 effects rotation of the lead screw 8 through the bevel gears 9 and 10. Unless such rotation of the gear 11 relative to the rotary head 3 takes place rotation of the lead screw 8 is not effected whether or not the rotary head 3 is rotated on the axis of the spindle 2. By means of the differential mechanism about to be described rotation of the lead screw 8 may be effected during rotation of the rotatable head 3 to effect feeding movement of the tool inwardly or outwardly with respect to the axis of the spindle 2. This may be accomplished by the drive through the shaft 12 from the shaft 13 and the clutch 14 interposed between these two shafts, this clutch being controlled through suitable transmission means by the lever 15 shown in Figs. 3 and 4. The shaft 13 may be controlled either by hand upon operation of the handwheel 4 connected by suitable gearing to the gear 16 keyed to the shaft 13 or else by means of the motor driven shaft 5. The shaft 5 drives the shaft 13 through the worm 17 and gears, not shown, connected to the gear 16 carried upon shaft 13.

My invention provides for making the feed of the tool carried by the slide plate 37 independent of the rotational movement of the rotary head 3, which is the preliminary essential condition in order that the rotation of the driving shaft 12 may correspond exactly to the feed of the tool, whatever may be the rotational speed of the head 3 so that consequently this shaft 12 may be used also for actuating the device for indicating the value of the feed of the tool. To this end, I use an arrangement such as that disclosed in my copending above-mentioned application, comprising a differential mechanism inserted between the means for effecting rotation of the rotatable head or carrier 3 which supports the tool and the means for moving the slide plate 37 and the tool relative to the head 3. The differential mechanism comprises a rotatable member 18 carrying the planet gears of the differential and having exteriorly mounted thereon a gear which meshes with a spur wheel 19, this spur wheel being fastened to the back member 31 of the rotatable head 3. Rotation of the head 3 and of the tool, therefore, takes place together with rotation of the spur wheel 19 and also with rotation of the rotatable member 18 of the differential in the ratio of the number of teeth of the spur wheel 19 to the number of teeth of the gear carried by the rotatable member 18.

The rotatable member 18 is carried upon the shaft 12 and is rotatable relative thereto. Meshing with the planet gears carried by the rotatable member 18 are sun gears also carried upon the shaft 12. The left hand of these sun gears in Fig. 4 is rotatable relative to shaft 12 and the right hand sun gear is fastened upon the shaft 12. The left hand sun gear carries a spur gear which meshes with the toothed wheel or gear 11. The bevel wheel 10, being fastened to toothed wheel 11 and having its axis coincident with that of the rotatable head 3, that is of the tool carrier, meshes with the bevel wheel 9 as above described. Feeding movement of the member 6 and of the plate 3 relative to the rotatable carrier, therefore, will be effected by and will exactly correspond to rotation of the shaft 12. This relation obtains when the rotatable tool carrier is not rotated about the axis of the spindle 2 as well as when this rotatable tool carrier is rotated on its axis. It will be understood that the proportions of the toothed wheel 11 and the spur wheel 19 and of the gears or wheels which mesh therewith and are carried by the rotatable parts of the differential may be such that, as the spur wheel 19 fastened to the rotatable tool carrier rotates on the axis of the spindle 2, the toothed wheel 11 also may rotate on its axis at the same speed and without movement thereof relative to the spur wheel 19. For this condition no rotation of the shaft 12 takes place and no feeding movement of the member 6 and of the tool will occur. If, however, the shaft 12 is driven the differential will be effective to produce relative movement between the toothed wheel 11 and the spur wheel 19 and feeding movement of the tool will take place relative to the rotatable tool carrier or head 3. This feeding movement may occur as the tool carrier is rotated on its axis.

The effect of the rotation of the toothed wheel 11 and spur wheel 19 will be the same as if the head 3 did not rotate and the linear displacements of the tool over the head will always remain the same whatever may be the rotational speed of the head. It is thus possible to follow these displacements of the tool by a transmission connected directly with the shaft 12 producing the feeding movement of the tool.

To this end the drum of the clutch 14 may be provided with a screw gear 20 exteriorly thereof which meshes with another screw gear 21, Fig. 3, carried upon a rotatable member or shaft 22. This shaft is supported in bearings 47 supported in the stock 1 for rotation thereof relative to the stock upon rotation of the shaft 12 upon engagement of the clutch 14.

The shaft 22 carries a thread for engagement with a nut 23 to produce travelling movement of the nut to and fro along the length of the shaft 22 in accordance with the direction of rotation of this shaft. The nut 23 carries a stud 49 which is movable therewith and which extends outwardly of the casing of the stock 1 through a slot 50 formed therein. The stud 49 engages at its outer end an inner slide 24 movable along the slot 50 in the stock 1 together with the stud 49 upon movement of the nut 23 along the shaft 22.

Fastened to the inner slide 24 by means of screws 51 is an outer slide 25 slideable along the guiding slideway 26 so that as the nut 23 moves along the shaft 22 the slide 25 moves along the slideway 26 together with the slide 24, the direction of movement of the slides 24 and 25 depending upon the direction of rotation of the shaft 22. The slide 25 is spaced by the plate 53 from the slide 24 to provide space for a partition or cover 27 which is fastened by suitable means, not shown, to the casing of the stock 1. The partition 27 is of such length relative to the length of the slot in which the stud 49 moves and in relation to the length of the slide 24 that, as the slide 24 tends to uncover the slot 50 by movement upwardly in Fig. 3, this slot remains covered by the partition 27, the lower end of the slide 24 in its upper position being lapped upon the partition 27 at its upper end. As the outer slide 25 is exterior to the partition 27 and moves with the inner slide 24 and the nut 23, this outer slide 25 serves in the manner about to be described to provide for indication of the movement of the nut 23 and therefore of the movement of the tool upon the rotary head 3. The construction which utilizes the slides 24, 25 and the partition 27 prevents the escape of oil outwardly from within the casing and the entrance of dust and other foreign material into this casing through slot 50.

The transmission ratios of the drives between the slides 24 and 25 and the feed shaft 12 are preferably chosen in such a manner that the displacements of the slides are equal to those of the tool over the rotary head or surfacing plate 3.

The outer slide 25 carries two vernier stops 28 which respectively may be adjusted in different positions in front of two scales 29 also carried by the slide 25, said stops and scales serving for the determination of the extreme positions of displacement of the tool and serving as indicators of movement of the tool. The scales 29 are arranged in opposite directions in order to allow for indicating and determining in the two possible directions of movement of the displacement of the tool over the head 3, and may be slightly shifted relative to each other lengthwise in order to compensate for the play arising between the pinions, worms and nuts according to whether the tool is fed over the plate radially outwardly or inwardly.

Figure 2:
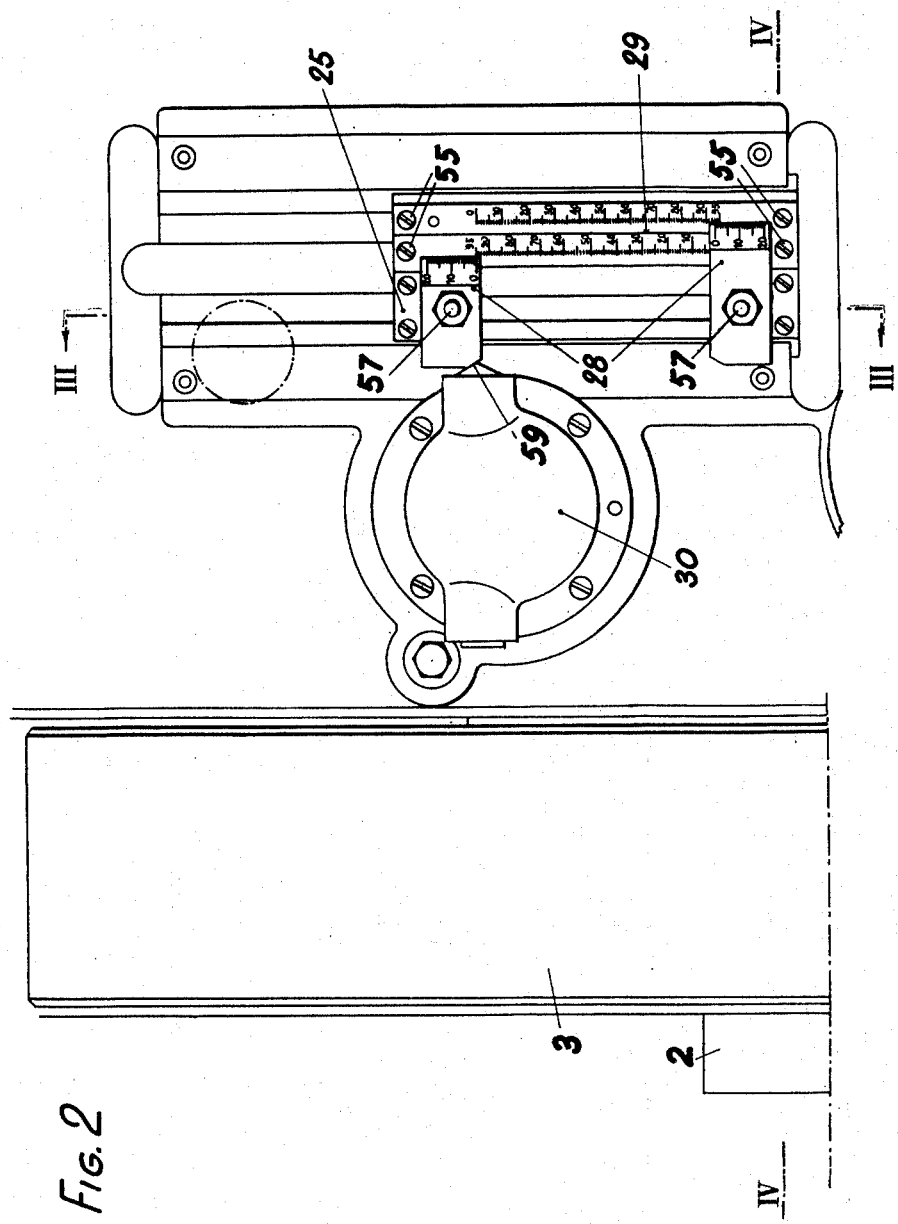
Fig. 2 is a view in elevation to enlarged scale of the tell-tale or indicating device for indicating the feed of the tool as applied according to the invention to the above mentioned boring machine.

It will be understood, therefore, that the scales 29, as shown in Fig. 2, are fastened to the slide 25 by means of screws 55. It will be further understood that the stops 28, an edge or other part of each of which may serve as the indicating element, are adjustable along the scales 29 to position the zeros of the verniers of the respective stops in any predetermined position along these scales to indicate and to determine the rectilinear displacement of the slide 25 and therefore of the tool carried by the slide member 37 on the rotary head 3. For effecting adjustment of the stops 28 relative to the scales these stops may be releasably fastened to the slide 25 by means of bolts 57 passing through a slot in the slide 25 which extends parallel to the scales 29 and to the direction of movement of the slide 25.

The stops 28 abut at the end of their displacement against a contacting block 30 (Fig. 2), said abutment causing the supply to the motor controlling the feed of the tool on the rotary head or surfacing plate 3 to be switched off whereby the tool is automatically stopped on the head with a very high accuracy.

To modify the extent of the feeding movement of the tool, the stops 28 should be displaced and adjustably positioned along the scales 29. Once this adjustment is effected and the machine is started, the operator may easily follow the displacement of the tool on the rotary tool head or surfacing plate 3 by observing the position of the stops 28 with reference to the contacting block 30 for instance. He may thus use these stops as indicators and accurately stop the tool as soon as he may desire it. Moreover, he may use the vernier stop 28 and the contacting block 30 for causing the tool to stop automatically at the end of its stroke with a very high accuracy.

It now will be understood that the slides 24 and 25 constitute a carriage movable on a fixed support, that is, the slideways 26 which are fixed upon the stock 1. In the claims reference to the fixed support is intended to be made to the stock 1 or similar member which, although it is movable to selected positions as above described vertically and horizontally on the column of the boring machine, ordinarily is fixed in relation thereto by suitable clamping means. The carriage of the device of the invention thus is movable in a predetermined path and the stops 28 carried thereby constitute elements settable on the carriage along this predetermined path to positions corresponding to different predetermined movements of the carriage, these movements representing the feeding movements of the tool as above described. The contacting block 30 and particularly the contact element 59 thereof constitutes a means fixed in relation to the fixed support adjacent the path of movement of the element 28 for determining as well as indicating in relation to this element the extent of the movement of the carriage in the predetermined path and, therefore, the extent of feeding movement of the tool on the rotary head 3.

Of course the device which has just been described and which has been shown in the drawing has been given only by way of an example. It may obviously receive numerous modifications in the details of its construction so as to take into account in particular the type of machine to which the invention is applied. Thus in particular the transmission members between the feed shaft 12 and the sliding indicator stops 28 may be replaced by any other equivalent members. Similarly, said indicators or stops instead of having displacements equal to those of the tool over its movable support may receive displacements which are exactly proportional to said displacements of the tool. It is sufficient for this purpose to modify the transmission ratios between said transmission members. Again the slides 24 and 25 instead of being driven from the clutch casing 14 may be driven from any other portion of the feed shaft 12.

It should also be stated that the invention is applicable not only to the case of a radial feed of the tool over a rotary plate but also to the case of feed over a movable member of a machine-tool, said member executing either a translational or a rotational movement, the constructional details in the transmission, of course, being modified accordingly.

What I claim is:

1. In a machine tool or the like having a tool feeding means, a device for indicating feeding movement of the tool comprising a fixed support, an indicating element supported on said support for movement relative thereto, means providing a scale associated with said indicating element and supported for movement thereof with said element upon said support, said element being settable in different positions along said scale and connectable thereto in the different positions for movement therewith to indicate the extent of movement of said element on said support, a rotatable member separate from said feeding means supported by said fixed support for rotation thereof on an axis, mechanical means providing a kinematic driving connection between said rotatable member and said indicating element and said scale connected thereto adapted to produce said movement of said element and said scale upon and in a predetermined relation to the rotation of said rotatable member, and a kinematic driving connection between said rotatable member and said tool feeding means adapted to rotate said rotatable member upon and in a predetermined relation to the feeding movement of said tool feeding means.

2. In a machine tool or the like having a rotatable tool feeding means, a device for indicating feeding movement of the tool comprising a fixed support, an indicating element supported on said support for movement relative thereto, means providing a scale associated with said indicating element and supported for movement thereof with said element on said support, said element being settable in different positions along said scale and connectable thereto in the different positions for said movement therewith to indicate the extent of movement of said element on said support, a shaft separate from said rotatable tool feeding means supported by said fixed support for rotation thereof on its axis and having formed on a portion thereof a screw thread coaxial with said shaft axis, a nut engaging said screw thread and supported for movement of said nut along said shaft upon rotation of said shaft, means operatively connecting said nut to said indicating element and said scale connected thereto to produce movement of said element and said scale upon movement of said nut along said shaft and in a predetermined relation to the rotation of said shaft, and a kinematic driving connection between said shaft and said rotatable tool feeding means adapted to rotate said shaft upon and in a predetermined relation to the rotation of said tool feeding means.

3. In a machine tool or the like having a tool feeding means the device for indicating feeding movement of the tool as defined in claim 1 which comprises a stop carried by said indicating element for movement therewith and adjustable therewith in relation to said scale with respect to the direction of movement thereof, and a tool feeding control means engaged by said stop upon movement of said indicating element upon said support corresponding to the setting of said element along said scale and operatively connected to said tool feeding means to stop movement of said tool feeding means upon engagement of said stop with said control means.

4. In a machine tool or the like having a tool feeding means the device for indicating feeding movement of the tool as defined in claim 1 in which said scale comprises two parallelly arranged scale members positioned with the scale markings of one scale offset with respect to those of the other scale along the length of the scales to compensate for play in said kinematic driving connections between said indicating element and said rotatable feeding means, and a pair of indicators carried by said indicating element and respectively settable along and connectable to said scales for indicating forward and reverse movements of said tool.

5. In a machine tool or the like having a tool feeding means the device for indicating feeding movement of the tool as defined in claim 1, said feeding means being operable forwardly and reversely, said scale comprising two parallelly arranged scale members positioned with the scale markings of one scale offset with respect to those of the other scale along the length of the scales to compensate for play in said kinematic driving connections between said indicating element and said rotatable feeding means, a pair of stops carried by and settable on said indicating element to selected positions lengthwise of said scales and respectively connectable to said scales to move therewith, and tool feeding control means actuated by the respective stops respectively in the forward and reverse movements of said element and operatively connected to said tool feeding means to stop feeding movement thereof respectively in said forward and reverse directions in positions corresponding to predetermined markings on the respective scales at which said stop means are set.

6. In a machine tool of the like having a rotatable tool feeding means, the device for indicating feeding movement of the tool as defined in claim 2 which comprises a casing extending about said shaft and having an opening therein through which said means operatively connecting said nut to said indicating element extends, said scale being supported exteriorly of said casing, said means operatively connecting said nut to said indicating element comprising a slide piece adapted substantially to cover said opening in one extreme position of the movement of said nut along said shaft and uncovering said opening in the opposite extreme position of said nut, said indicating element being carried by said slide piece in spaced relation thereto, and a shield member positioned between said indicating element and said slide piece for sliding movement of said piece and said element in relation thereto and adapted to cooperate with said slide piece to maintain said opening covered when said slide piece is in the position in which it uncovers said opening.

7. A device for indicating the feeding movement of a tool in a machine tool or the like having a tool feeding means which comprises a fixed support, a carriage moveable on said support in a predetermined path of movement, an element carried by said carriage and settable thereon along said path to positions corresponding to different predetermined movements of said carriage representing the feeding movements of said tool, means fixed in relation to said fixed support adjacent to said path of movement of said element carried by said carriage for determining in relation to said element the extent of movement of said carriage in said predetermined path, and means operatively connecting said tool feeding means to said carriage for effecting said movement of said carriage representing movement of said tool.

8. A device for indicating the feeding movement of a tool in a machine tool or the like having tool feeding means which comprises a fixed support, means providing a scale supported on said support for movement thereof relative to said support lengthwise of said scale, an element supported on said support for movement relative thereto and connectable to said scale means to move therewith, said element and said scale being settable with respect to each other to positions corresponding to different predetermined movements of said element and said scale upon said support representing movements of said tool, means fixed in relation to said fixed support for determining the extent of movement of said element and said scale with respect thereto, and means operatively connecting said tool feeding means and said element for effecting movement of said element corresponding to said movement of said tool in the machine tool.

9. A device for indicating the feeding movement of a tool supported on a member movable in a predetermined path in feeding movement upon a rotatable part of a machine tool or the like having a rotatable feeding means operatively connected to said tool supporting member for effecting feed-movement of said member carrying said tool along said path, which comprises a fixed support, a carriage movable on said support in a predetermined path of movement corresponding to said predetermined path of movement of said member, mechanical means providing a kinematic driving connection between said rotatable feeding means and said carriage for effecting movement of said carriage corresponding to feeding movement of said tool upon rotation of said rotatable tool feeding means, an indicating element carried by said carriage for movement therewith, and an index member mounted in fixed relation to said fixed support adjacent the path of movement of said indicating element for indicating with respect to said element the movement of said tool on said rotatable part of the machine tool.

10. A device for indicating feeding movement of a tool upon a rotatable part of a machine tool or the like as defined in claim 9, which comprises a scale carried by said carriage for movement therewith lengthwise of said scale and with said indicating element along said path for indicating by the relation of said index member to said indicating element along said scale the measurement of the feeding movement of said tool.

11. A device for indicating movement of a movable member of a machine which comprises a fixed support, a carriage movable on said support in a predetermined linear path of movement, an indicating element carried by said carriage to move therewith and settable thereon along said path to positions corresponding to different predetermined movements of said carriage representing movements of said movable machine member, means fixed with respect to said fixed support adjacent the path of movement of said indicating element carried by said carriage for indicating in relation to said element the extent of movement of said carriage in said predetermined path, a rotatable member supported on said fixed support and adapted to be connected to and rotatably driven by said movable machine member, and a kinematic driving connection between said rotatable member and said carriage for effecting linear movement of said carriage along said path corresponding to rotation of said rotatable member to represent movement of said machine member.

12. A device for indicating movement of a movable member of a machine which comprises a fixed support, means providing a scale supported on said support for movement relative to said support in a predetermined linear path of movement lengthwise of said scale, an indicating element supported on said support for movement relative thereto along said linear path and connectible to said scale means to move therewith, said indicating element and said scale being settable with respect to each other along said path to positions corresponding to different predetermined movements along said path of said scale and said element connected thereto representing movements of said movable machine member, means fixed with respect to said fixed support for indicating in relation to said indicating element the extent of movement of said element and said scale along said path, a rotatable member supported on said fixed support and adapted to be connected to and rotatably driven by said movable machine member, and a kinematic driving connection between said rotatable member and said settable indicating element connected to said scale for effecting linear movement of said indicating element and said scale corresponding to said movement of said machine member.

CHARLES WILLIAM BERTHIEZ.

REFERENCES CITED

The following references are of record in the file of this patent:

UNITED STATES PATENTS

| Number | Name | Date |
|--------|------|------|
| 1,082,652 | Roth | Dec. 30, 1913 |
| 1,994,879 | Tweit | Mar. 19, 1935 |
| 2,196,231 | Ridgway | Apr. 9, 1940 |
| 2,367,555 | Arney | Jan. 16, 1945 |

Certificate of Correction

Patent No. 2,512,296 June 20, 1950

CHARLES WILLIAM BERTHIEZ

It is hereby certified that errors appear in the printed specification of the above numbered patent requiring correction as follows:

Column 2, line 47, for the words "member of" read *member or*; column 3, line 7, after "movement" insert *of*; column 5, line 46, after "movement" strike out "of"; line 74, for "stopper" read *stopped*;

and that the said Letters Patent should be read with these corrections therein that the same may conform to the record of the case in the Patent Office.

Signed and sealed this 26th day of September, A. D. 1950.

[SEAL]

THOMAS F. MURPHY,
*Assistant Commissioner of Patents.*